United States Patent [19]

Jarvinen

[11] 4,135,489
[45] Jan. 23, 1979

[54] SOLAR ENERGY CONVERSION SYSTEM

[75] Inventor: Philip Jarvinen, Amherst, N.H.

[73] Assignee: Sanders Associates, Inc., Nashua, N.H.

[21] Appl. No.: 612,434

[22] Filed: Sep. 11, 1975

[51] Int. Cl.² ............................................. F24J 3/02
[52] U.S. Cl. ................................... 126/270; 126/271
[58] Field of Search ................................. 126/270, 271

[56]   References Cited
       U.S. PATENT DOCUMENTS

| 683,088 | 9/1901 | Wideen | 126/270 |
|---|---|---|---|
| 3,875,925 | 4/1975 | Johnston | 126/270 |
| 3,901,036 | 8/1975 | Martin | 126/270 |
| 3,939,818 | 2/1976 | Hamilton et al. | 126/270 |

Primary Examiner—John J. Camby
Assistant Examiner—Larry I. Schwartz
Attorney, Agent, or Firm—Louis Etlinger; Robert K. Tendler

[57]   ABSTRACT

A solar energy conversion system is provided which includes a black body receiver for transferring energy from focused solar radiation to a circulating gas. The receiver includes a honeycomb heat exchanger located within a chamber sealed with impingement cooled windows, the outermost one of which acts as a one way trap or diode to prevent energy radiated by the heated honeycomb from escaping to the atmosphere. The heat exchanger is formed with a number of tubes which are oriented to be illuminated "end on" for minimizing retroreflection of the incoming energy. Because of the "end on" orientation, a large majority of the incoming energy impinges on the internal walls of the tubes and is internally reflected until it is absorbed. Cool gas, which may be air, is introduced into the receiver under pressure such that the gas passes through the tubes of the heat exchanger where it is heated to temperatures that are typically in the vicinity of 1700° F. The heated gas is then extracted from the receiver downstream of the tubes.

29 Claims, 16 Drawing Figures

RECEIVER WITH IMPINGEMENT COOLED THREE WINDOW CONFIGURATION

FIG. 1

FIG.2 RECEIVER WITH IMPINGEMENT COOLED THREE WINDOW CONFIGURATION

FIG.3 REQUIRED WINDOW THICKNESS AS A FUNCTION OF RECEIVER DIAMETER

FIG.4 TRANSMITTANCE AND TRANSMISSION AS A FUNCTION OF WINDOW THICKNESS

FIG.5 TRANSMITTANCE OF GE TYPE 124 AND 125 FUSED SILICA WINDOWS

SIMPLIFIED HONEYCOMB CONFIGURATION

FIG. 6

ABSORBTION OF INCIDENT SOLAR ENERGY IN ALIGNED HONEYCOMB

FIG. 7

CHEVRON HONEYCOMB FOR IMPROVED ON AXIS SUNLIGHT COLLECTION

FIG. 8

AIRFLOW REQUIREMENTS AS A FUNCTION OF TEMPERATURE RISE

FIG. 9

BRAYTON CYCLE WITH SOLAR ENERGY RECEIVER

FIG. 10

BRAYTON CYCLE P-V DIAGRAM

SOLAR ENERGY CONVERSION SYSTEM

FIELD OF THE INVENTION

This invention relates to an improved solar energy collection system and more particularly to a receiver which enables the solar energy conversion system to operate at high temperatures to increase efficiency of the system.

BACKGROUND OF THE INVENTION

Solar energy collection systems in the prior art include those involving unfocused solar energy and those including focused solar energy. In the case of unfocused solar energy it will be appreciated that while it is theoretically possible to obtain 10,300° F. from a focused spot it is only theoretically possible to obtain 660° F. in the unfocused case. In practical systems using unfocused radiation and flat plates to heat water, only 100° F.–145° F. is possible. The result is that systems utilizing unfocused solar energy, e.g. flat plate systems, are only 10–20% efficient in converting solar energy to do work as compared with an 80% efficiency obtained when solar energy is focused. This is because in heat engines, the higher the temperature of the input fluid the more efficient will be the conversion of thermal energy into mechanical energy. Up to this time, focused solar energy has been coupled into a liquid such as water for producing steam which is used to do work. Because liquids at high temperatures are extremely corrosive, handling problems prevent the use of most systems which utilize liquid as the transfer medium to maximum efficiency. For example, almost all of the systems utilizing focused solar radiation have up to now been based on the conversion of water into steam in a boiler. These systems typically require a continuous water supply for cooling and are usually limited to temperatures below 1000° F. Above this temperature, steam becomes increasingly corrosive, severely limiting the useful life of many of the components in the system. Because of these difficulties the efficiency of a steam cycle plant is limited. It should be noted that systems involving liquid-gas phase transitions, like steam, are generally optimal over a narrow range of pressures and temperatures. Moreover, if the critical temperature of the fluid is exceeded there will be no transition from the vapor phase to the liquid phase, thus eliminating the low power advantage associated with moving liquids as opposed to vapor.

It has been found, however, that a system in which solar energy is coupled into a gas presents fewer problems in the handling and is operable over a much higher and wider range of temperatures. Thus, the transfer medium in the subject system is gas. One such system is illustrated in French Pat. No. 1,035,833 issued in 1953 to Felix Trombe. In this system solar energy is focused onto a solar receiver which has a restricted aperture and a dome like window so that heat from the heat exchanger in the receiver will not melt the window. In this patent the window is prevented from melting, not by impingement cooling, which is the subject of the present invention, but rather by restricting radiation from the heat exchanger and curving the window to be as far removed from the heat exchanger as possible. This present system utilizes a receiver which can withstand the high temperatures made possible by focusing solar radiation and is characterized in one embodiment by a sealed chamber which has a honeycomb heat exchanger positioned within the chamber with its tube-like channels parallel to the axis of the focusing optics. The purpose of the honeycomb structure is to provide a large wall area for the gas to contact, with the walls running parallel to the axis of the focusing optics so that the focused light impinges on the honeycomb structure "end on". This "end on" configuration is used so that all of the impinging radiation is internally reflected within the honeycomb until it is absorbed by the walls, such that very little solar energy is reflected back to the focusing optics.

In an important aspect of the subject invention, one end of the chamber is sealed with an impingement cooled window to prevent escape of energy from the heated honeybomb. The impingement cooling prevents the window from melting and thus permits the receiver to operate at very high temperatures in a closed or sealed system. The receiver in this configuration is so efficient it acts as a black body receiver to collect large amounts of solar energy. The receiver operates at much higher temperatures than steam systems or liquid systems in general and the overall efficiency of the conversion system is enhanced to the extent that higher temperatures result in higher conversion efficiencies. For the present purposes, a black body receiver is a device which absorbs all or nearly all of the energy impinging on it for wavelengths of interest. The absorption of this energy results in the raising of the temperature of the body, in this case the specialized honeycomb heat exchanger within the receiver. For purposes of this invention the range of wavelengths in the solar energy spectrum which are most effective to heat up the heat exchanger are between 0.3 and 3.0 microns.

Obviously it is impossible to make a perfect black body receiver. However, in order to efficiently transfer solar energy to a gas, a new type of heat exchanging system was developed in which retroreflection of the focused energy is limited both by the "end on" honeycomb illumination and by one or more windows which are transparent to short wavelength solar energy, while reflecting energy produced by long wavelength radiation from the heated honeycomb. In the embodiments discussed, the windows are impingement cooled in a manner which enables them to withstand the extremely high temperatures involved in the focusing of solar energy. A less efficient system, also within the scope of this invention, involves dispensing with the windows and merely sucking air through an unrestricted aperture past the honeycomb heated by focused solar radiation.

By using a solar-gas system, and by making the honeycomb of silicon carbide and using impingement cooled quartz windows, the apparatus operates at temperature well above 2000° F. and as high as 5000° F. Moreover, since ordinary air from the environment can be used as the heat transfer fluid, cooling can be achieved by allowing spent gas to escape to the atmosphere if an open cycle system is desired, eliminating the need for access to a large volume of water. If a closed cycle system is preferred, the gas can be nitrogen or other relatively inert inexpensive gas as well as air.

What is therefore provided by this invention is a black body receiver which includes an enclosed chamber and a window through which solar radiation is focused. The window is cooled to prevent melting by the influx of the cool gas which is to be heated by the exchange of energy between the solar radiation and the gas. The cool gas impinges upon the window and is redirected in a turbulent fashion towards a honeycomb heat exchanger in which the honeycomb channels are illuminated "end on" and are heated by the solar energy. The honeycomb readily absorbs solar energy and heats up regardless of whether the honeycomb walls are primarily specular of diffuse because of the internal energy reflection within the channels. The channels are long enough so that substantially all the energy impinging on the heat exchanger is absorbed via multiple internal reflections in which some energy is absorbed with each reflection. Thus, nearly all incident energy is finally absorbed. The honeycomb is not only an efficient light energy absorber, but its channeled construction also makes it effective for heat transfer by convection to a gas flowing through it. The turbulent gas is forced through the honeycomb and obtains energy by contact with the heated honeycomb walls.

In one embodiment multiple windows are utilized with the outside window being transparent to the incoming radiation while at the same time being able to contain the incoming gas. The windows prevent radiation from the heated honeycomb from escaping because they are reflective in the red and infrared region of the electromagnet spectrum, and therefore reflect this radiation back towards the honeycomb. In between the outer window and the honeycomb structure a number of windows may be provided which are apertured to increase the turbulent flow arond the windows while permitting the gas to impinge upon and flow through the honeycomb structure. The gas turbulence results in cooling of both the outer and inner windows while secondarily the gas absorbs heat from the windows. The gas flow pattern throughout the heat exchanger is such that the largest portion of gas is directed towards the honeycomb structure after first impinging on the outer window, while secondary turbulent gas is permitted by virtue of the window configuration and by the window mounting apparatus which permits the flow of gas around the inner windows thereby to establish primary and secondary flow patterns to optimize the heat exchange.

In one embodiment the subject heat exchanger may be mounted on a mast above an array of individually steerable reflective elements which track the sun and focus the sun's radiation onto the heat exchanger.

It is therefore an object of this invention to provide an improved solar energy conversion system in which focused solar energy is coupled into a heat transfer medium which is a gas rather than a liquid.

It is another object of this invention to utilize focused solar energy and a high temperature energy converter for maximum efficiency in solar energy conversion, in which the energy converter includes a heat exchanger having channels illuminated "end on" by focused solar radiation to minimize retroreflection.

It is a still further object of this invention to provide a solar energy conversion system in which the heat exchanger operates at an extremely high temperature and includes an enclosed chamber with a transparent wavelength selective window which permits the influx of solar radiation while preventing the thermal energy radiated from the heat exchanger from escaping.

It is yet another object of this invention to provide a high temperature black body receiver utilizing an enclosed chamber and multiple windows, along with a honeycomb heat exchanging member in which a primary and secondary flow path of gas is provided with the primary flow directly into the honeycomb structure and with the secondary flow involving a turbulent gas flow around the windows for cooling purposes.

It is a still further object of this invention to provide an inexpensive solar energy conversion system in which a solar-to-gas cycle is utilized.

These and other objects of this invention will be better understood in connection with the following description in view of the appended drawings in which:

DETAILED DESCRIPTION

Figure 1:
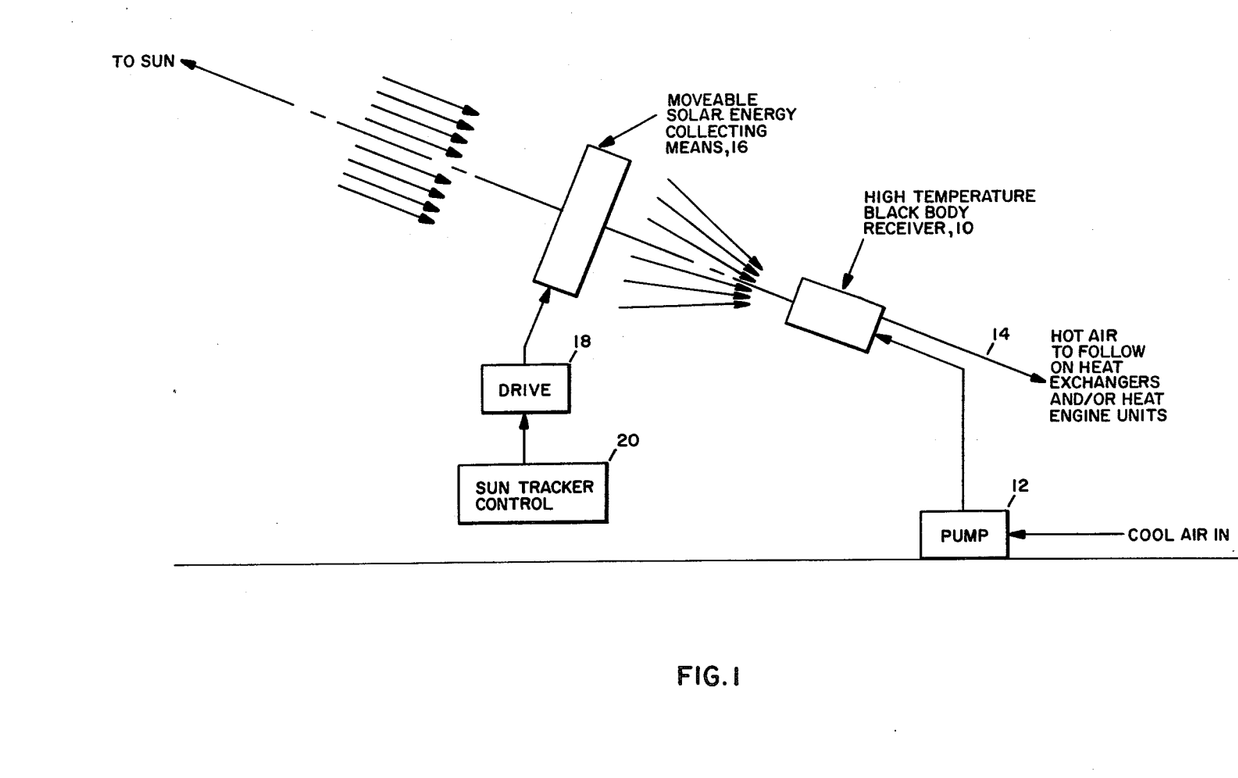
FIG. 1 is a diagrammatic representation of one embodiment of the subject invention including a high temperature black body receiver and moveable solar collecting means which track the sun.

Referring to FIG. 1, in one embodiment the subject solar collection system includes a high temperature black body receiver 10. A pump 12 is provided to pump air or any other gas to black body receiver 10. Heated air from receiver 10 is coupled out of the system via line 14. In this embodiment the receiver is located at the focus of moveable solar energy collecting means 16 which may be any suitable solar collector such as a Fresnel lens, parabolic collector, traditional lens or as described in connection with FIGS. 14–16 a bank of steerable planar reflectors. The collecting means may be mounted on any suitable sun tracking apparatus driven by any suitable drive 18 controlled by any suitable preprogrammed control 20. Such a system might be a standard equitorial mount with a standard clock drive. Also any number of gimbal drive mechanisms may be used to keep the collecting means pointed at the sun.

In operation, air is pumped through black body receiver 10 which is located at the focus of the collector means. With the collector means tracking the sun, solar energy is focused on the heat exchanger within the receiver.

The ability to couple energy efficiently into a gas is in large measure due to the unique black body receiver employed in this invention. This receiver closely approximates a black body receiver in its ability to couple all of the useful energy in the incident radiation into the gas with negligible losses due to radiation from the hot heat exchanger within the receiver. The design of the heat exchanger in one embodiment is illustrated in cross section in FIG. 2.

Figure 2:
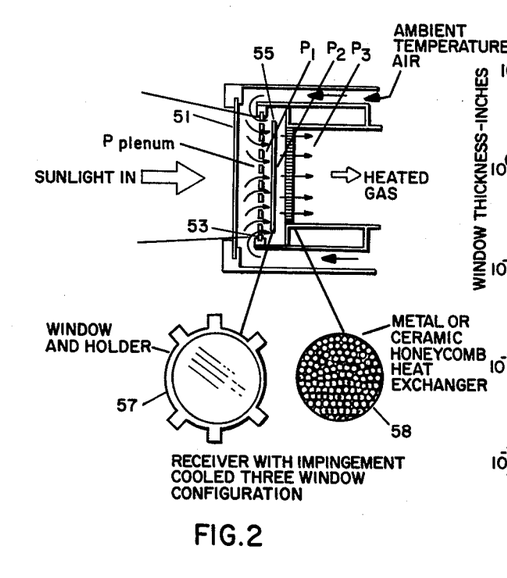
FIG. 2 is a cross sectional and diagrammatic representation of one type black body receiver for use in the system of FIG. 1.

Referring now to FIG. 2, in this system a gas is used as the heat transfer fluid. The gas impinges on windows 51, 53 and 55 providing the cooling necessary to prevent softening. Outer window 51 is planar and the gas impinges on only one side. Intermediate window 53 is apertured to create the aforementioned turbulent flow. Inner window 55 is supported by a tabbed ring holder 57 to permit gas flow around the window to a honeycomb heat exchanger 58. The tern "honeycomb" as used herein refers not only to the traditional hexagonal cross section structure, but rather to any body having a number of closely packed channels running throughout. In one embodiment this heat exchanger is comprised of a number of tubes or tube-like channels oriented along the longitudinal axis of the receiver. However, the orientation of these channels need not be parallel to the longitudinal axis of the receiver but rather can be at any orientation in which incoming light impinges on the open ends of the channels so that the large majority of the light is directed to the interior walls of the channels. The length of a tube-like channel involves a tradeoff between the precent of absorption obtained (the longer the tube, the greater the absorption of incident radiation) and the degree of heat transfer to the gas vs. the temperature which the tube finally reaches (the longer the tube the lower the temperature). Because the orientation of the tubes very little energy impinging on the tube is reflected towards the windows. Rather the reflected radiation is internal and along the gas flow away from the windows. The heat exchanger can be made of metal or ceramic material such as silicon carbide and can be of any configuration which allows gas to pass therethrough. The gas partially heated by the windows flows through the honeycomb where the major heat transfer takes place. The heated gas can be ducted to storage or converted to useful work in a thermodynamic cycle such as the Brayton cycle.

10 KW Design

In the discussion which follows several of the operating parameters and technical considerations for one embodiment of a solar energy receiver are discussed. In this one embodiment, a parabolic solar reflector of 20 ft. diameter is assumed with a focused spot size of 1 ft. diameter and a thermal output of 10 kilowatts. In the discussion which follows the calculations are made on the assumption that the gas used is air; however, alternative gases and gas mixtures such as pure nitrogen or nitrogen mixtures may, of course, be used and are within the scope of this invention.

Protective Windows

In order to contain the radiation from the heated honeycomb while allowing the incoming solar radiation to be transmitted to the honeycomb the front of the receiver is sealed with a window which is transparent to the solar energy and is reflective to infrared radiation. In addition, the use of a sealed system increases design flexibility by allowing the use of gases and gas mixtures which can be chosen for their efficient heat transfer properties.

As illustrated in FIG. 2, in order to provide the required cooling a three window configuration is utilized in the receiver. In such a configuration the outer window is used to establish a plenum for the air flow and the intermediate window is perforated with a large number of circular holes through which the air can pass. Air flowing through these holes forms a jet which impinges on the inner window. The impingement cooling technique has proven to be 3 to 6 times more effective than the use of film cooling techniques.

Window Thickness

The pressure level decreases through the unit from $P_{plenum}$ to $P_1$, to $P_2$ and then to $P_3$ as illustrated in FIG. 2. The pressure drop across each window establishes the air flow through the unit. In one embodiment the pressure drop required across a window for airflow or cooling considerations is less than 1 PSI. Therefore the inner two windows have a pressure differation of 1 PSI or less across them and may be very thin. The outer window sees a pressure differential equal to the operating pressure level of the receiver and must be sufficiently thick to carry the pressure loading. The maximum allowable bending stress is given by equation (1).

$$m = K_1 (d/t)^2 P \tag{1}$$

where $$m = \frac{\text{Rupture Tensile Stress (PSI)}}{\text{Design Safety Factor}}$$

$K_1$ = Constant = 0.1875 for clamped edges
d = Window Diameter (inches)
t = Window Thickness (inches)
P = Differential Pressure (PSI)

Figure 3:
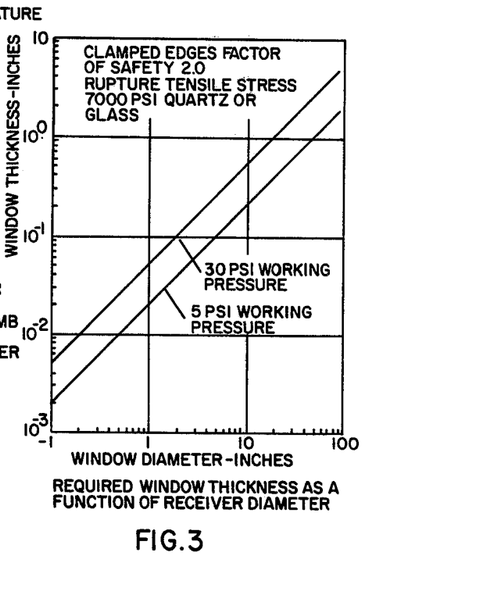
FIG. 3 is a graph of window thickness as a function of receiver diameter.

In view of the above, fused quartz and tempered glasses may be utilized for the protective window scheme. Window thickness requirements as a function of receiver diameter have been determined for window differential pressure loadings for of 5 and 30 PSIG and the results are shown in FIG. 3. The results are presented for a water free fused quartz material (GE Type 124 or GE Type 125) with a rupture tensile stress of 7000 PSI and a safety factor of 2. Fused quartz windows with diameters of up to 72 inches are available from General Electric. Equation (1) neglects window thermal stress due to temperature gradients but this effect has been determined to be small in the present window design.

Absorption of Incident Solar Energy By A Window

Figure 4:
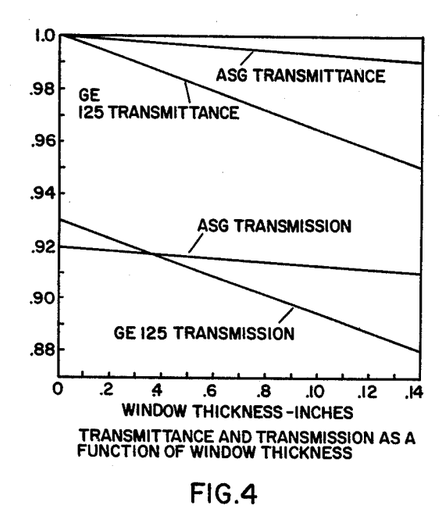
FIG. 4 is a graph of transmittance and transmission as a function of window thickness.

The energy absorbed as the incident solar energy passes through the window in terms of percentage transmittance is graphed against window thicknexx in FIG. 4 for two window materials — GE fused quartz type 124 or 125 and ASG glass. It should be noted that these materials are but two of a large number of potentially applicable materials.

Figure 5:
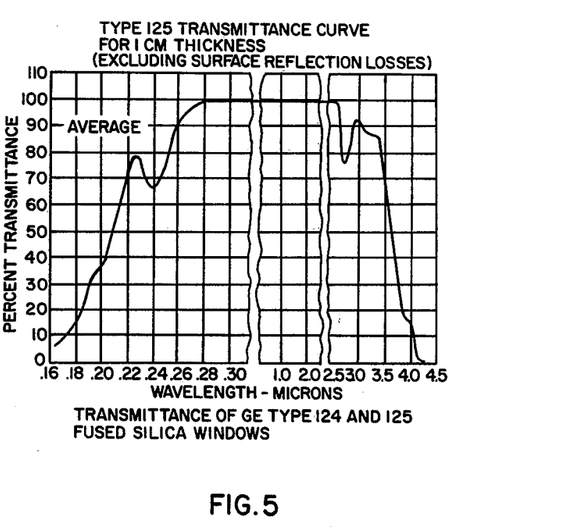
FIG. 5 is a graph of transmittance vs. wavelength for fused silica windows.

The transmission figures include absorption as well as reflections at two surfaces while the transmittance includes absorption effects only. These results were obtained by folding the solar spectrum against the properties of the windows. A graph of the transmittance of GE Type 124 and 125 versus wavelength which was used in the calculations is shown in FIG. 5. From this data it can be seen that the window acts as a one way trap or diode to permit energy from escaping as follows: Energy from 0.3-3 microns is transmitted by the window and is absorbed by the heat exchanger which heats up. The hot heat exchanger radiates in the longer wavelengths (the red and infrared). This radiation is reflected back towards the heat exchanger by the receiver walls and the window since the window and walls are reflective at these wavelengths. Thus the window acts as a one way trap or diode to accept 0.3-3 micron radiation while reflecting red and infrared radiation back to the heat exchanger.

It should be noted that the window transmittance and transmission decrease with increasing window thickness (FIG. 4). The transmittance and transmission for a 30 PSI working pressure 12 inch window of 0.58 inch thickness are 0.98 and 0.91 respectively. This indicates that the presence of a window has a very small effect on the magnitude of the solar energy reaching the honeycomb.

Honeycomb Heat Exchanger

Figure 6:
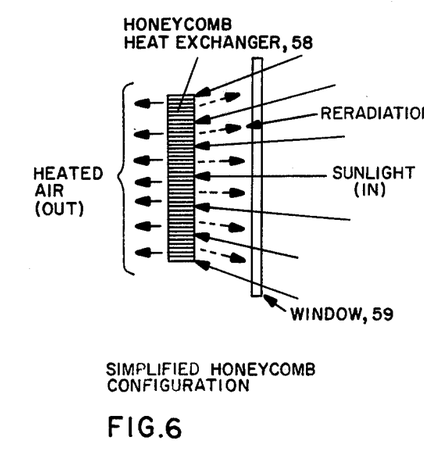
FIG. 6 is a simplified diagram of the subject black body receiver.
Figure 7:
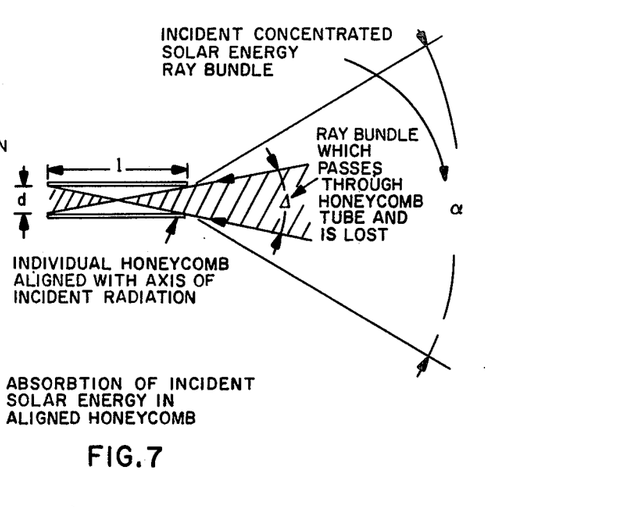
FIG. 7 is a diagrammatic representation of a single honeycomb tube.
Figure 8:
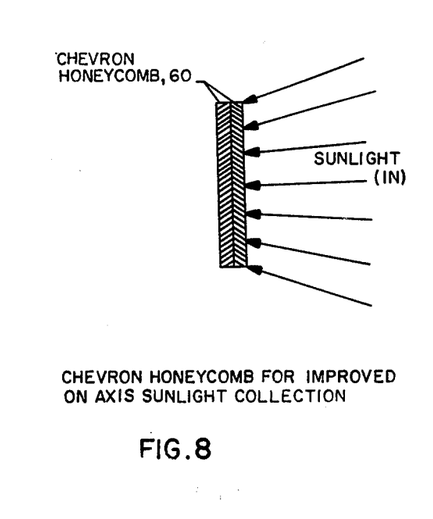
FIG. 8 is a diagram of a chevron configured honeycomb.

A simplified schematic diagram of a honeycomb is illustrated in FIG. 6. Utilizing a single window 59 with thickness sufficient to hold a given working pressure and assuming that the honeycomb captures 100% of the incident solar flux, high capture efficiencies occur when a honeycomb is used with a high concentration ratio collector (C.R. > 1000) and when the honeycomb has a length to diameter ratio greater than L/D = 20. The large concentration ratio assures a large solid angle of the incident solar energy ray bundle while the use of honeycomb tubes with a large L/D ratio increases the likelihood of capturing the energy. What this means is that off-axis rays will impinge on an interior wall and be reflected a number of times each time giving up a certain percentage of energy to the walls, whether the honeycomb walls are specular or nonspecular. The longer the tube, the more internal reflections and the more complete will be the energy transfer. Also, with longer tubes the number of rays which pass through the tube without impinging on a tube wall will be minimized. Long tubes thus minimize the loss of that portion of the incident solar energy ray bundle which makes small angles with respect to the axis of the honeycomb and which passes through the honeycomb without touching the tube walls (FIG. 7). Another technique, that of using a chevron honeycomb (FIG. 8), completely eliminates losses of the small angle portion of the incident ray bundle. This approach is particularly suited to high f number systems where a majority of the incident rays arrive at the honeycomb with small angles with respect to the system axis.

Required Airflow

Figure 9:
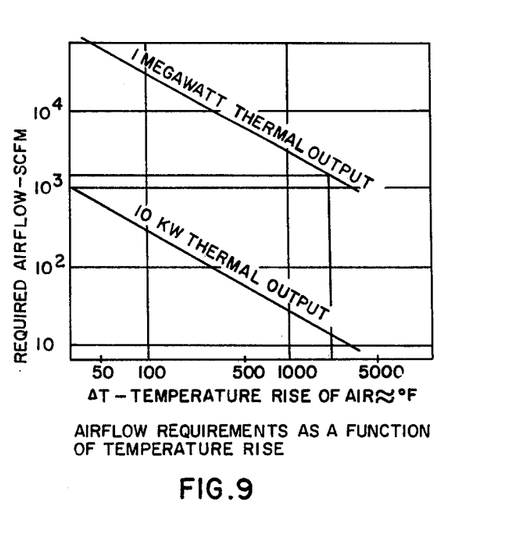
FIG. 9 is a graph of air flow vs. temperature rise.

The required airflow for a given temperature rise of the air is shown in FIG. 9 for one megawatt and ten kilowatt thermal outputs. These results are obtained by equating the desired thermal output to the heat capacity of a given airflow assuming 100% conversion efficiency. In this embodiment the honeycomb has a tube density of 70 tubes/in.$^2$ with a honeycomb length of 9 inches and an air flow velocity of 10 SCFM (standard cubic feet/min.).

Note that for a given heat exchanger efficiency, $\eta$, honeycomb length is minimized by maximizing the number of tubes/inch$^2$ in the honeycomb. This is true as long as the pressure drop required to push gas through the honeycomb remains small. The ceramic honeycomb presently being used has 70 tubes/in.$^2$; however, other tube densities are clearly within the scope of this invention. Moreover, with a relatively thick honeycomb, a 0.99 heat transfer efficiency is possible. Note also that with a 0.90 heat exchanger efficiency a substantial reduction in honeycomb thickness can be accomodated.

One Megawatt Design

In another embodiment the operating characteristics of a one megawatt thermal receiver for use at a solar facility in which individually steerable flat reflectors redirect sunlight to a focus are summarized in Table 1.

TABLE 1

| | |
|---|---|
| Thermal Output | 1 megawatt |
| Receiver Diameter | 1 foot |
| Air Flow Rate | 10 SCFM/in.$^2$ |
| Operating Pressure | 30 PSI |
| Window Thickness | .58 inches |
| Window Transmission (FE125) | 91 percent |
| Honeycomb Length (70 tubes/in.$^2$ T = 2000° F $\eta$ = 0.90) | 9 inches |

Brayton Cycle Engine

Figure 10:
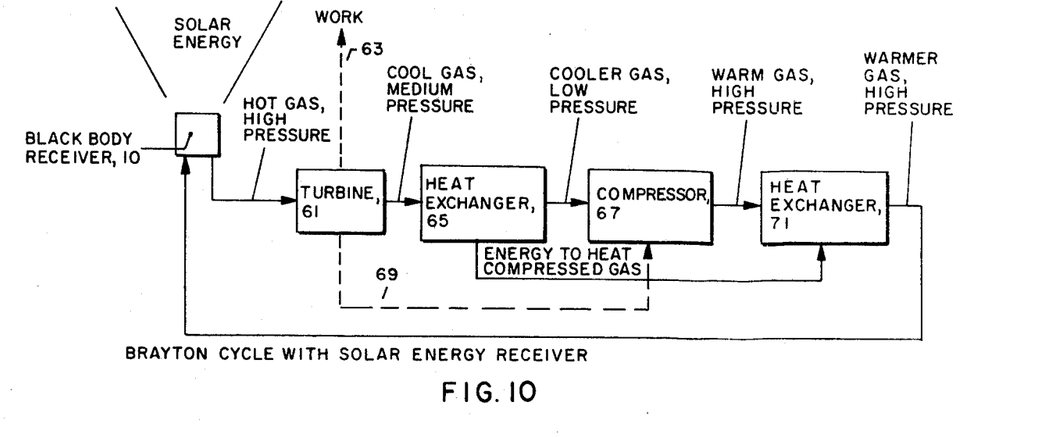
FIG. 10 is a block diagram of a Brayton cycle engine utilizing the subject black body receiver.

The above mentioned black body receiver 10 may be utilized in a Brayton cycle engine which is diagramatically illustrated in conection with FIG. 10. The Brayton cycle is a fairly idealized thermodynamic cycle also known as the Joule-Kelvin cycle, bounded by two adiabatic processes and by two isobaric (constant pressure) processes. For a given set of maximum and minimum cycle temperatures, it is second in efficiency only to the Carnot cycle and is much more efficient than the piston engine cycle. The reason for the use of the Brayton cycle engine is the constant pressure expansions and contractions called for respectively in the heat input and output portions of the cycle which conveniently fit conditions in a turbine engine. Thus, turbine simplicity and efficiency is introduced.

Figure 11:
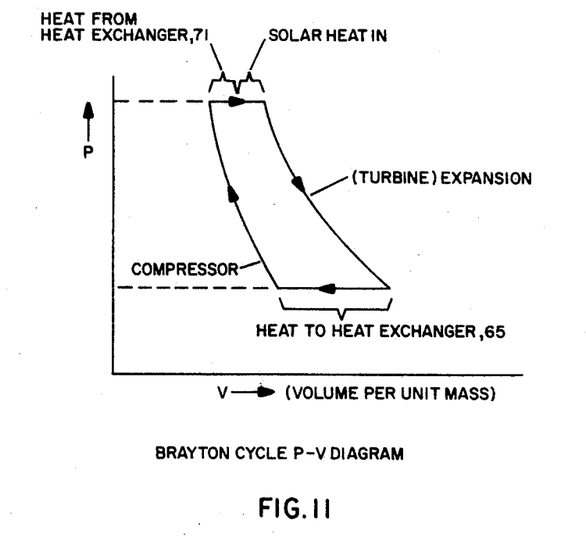
FIG. 11 is a P-V diagram for the Brayton cycle engine of FIG. 10.

As illustrated in FIG. 10, when the subject solar receiver is used with a Brayton cycle engine hot gas under pressure exits the receiver with the solar energy having been imparted to the hot gas. This hot gas high pressure stream is coupled to a turbine 61 and is utilized to drive the turbine. Energy is coupled out of this system from the turbine shaft as illustrated by dotted line 63. As is typical of turbines, the high pressure gas expands as it passes through the turbine. The removal of energy from the gas results in cool gas exiting the turbine at medium pressure. This gas stream is coupled to heat exchanger 65 which extracts more heat from the gas and results in an output down-stream of the heat exchanger in which cooler gas at a lower pressure is available. The output of heat exchanger 65 is coupled to the input of a compressor 67 driven by turbine 61 as illustrated by dotted line 69. The cool low pressure gas from heat exchanger 65 is compressed by compressor 67 with the resultant output being a warmer gas at high pressure. The output of compressor 67 is delivered to heat exchanger 71. The output from heat exchanger 71 is warmer gas at high pressure which is delivered back to the black body receiver 10, completing the Brayton cycle. For convenient reference, the P-V cycle for the Brayton cycle engine is illustrated in FIG. 11.

From the above description one of the most important aspects of this engine is that the expander (turbine) develops enough energy to power the compressor with an excess of power to the output shaft. It will thus be appreciated that the total energy available from turbine 61 exceeds the energy utilized to drive compressor 67 such that there is a net surplus of energy due to the absorption of solar energy by the subject black body receiver. In terms of real efficiency the Brayton cycle engine affords an overall efficiency of close to 85% when a black body receiver of the subject design is utilized. The reason for this relatively high efficiency is the high working temperatures associated with the subject black body receiver and the gas cycle.

Hemispherical Receiver

Figure 12:
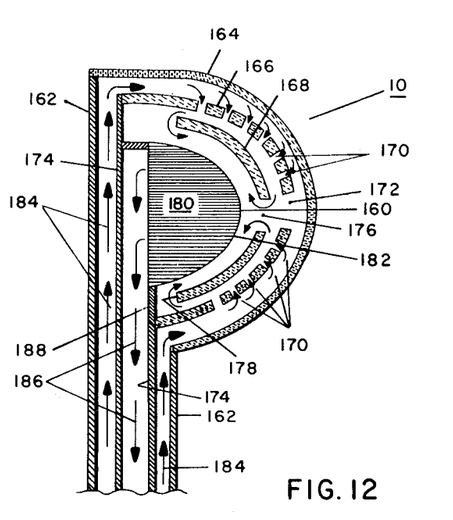
FIG. 12 is a sectional view of another embodiment of the subject high temperature black body receiver illustrating another multiple window approach in combination with a honeycomb structure.

In another embodiment, a hemispherical receiver may be provided which need not be rotated with the focusing optics. As such this receiver is defined as a "stationary" receiver. Referring to FIG. 12 in this embodiment the black body receiver takes on a generally hemispherical shape with the hemisphere pointing towards the focusing optics. In this embodiment the receiver is located at the focus of the optical system. The receiver includes a chamber 160 which is bounded by walls 162, a portion of which make up the aforementioned co-axial line. Chamber 160 is completed via a spherical window 164 which, in one embodiment, is made from quartz so as to withstand the high temperatures involved in focusing solar radiation to a particular point in space. As in the first embodiment, the purpose of this outer window is to prevent the escape of any energy radiated by the heat exchanger. Two additional windows 166 and 168 are provided interiorally of window 164 with each of the windows provided with apertures. Each of the windows is made from quartz in one embodiment with window 166 having a plurality of side apertures 170 and a central aperture 172. This window is joined at its exterior edge to an expanded portion 174 of the co-axial line.

Inner window 168 is provided with a central aperture 176 and has its edges 178 free of portions 174 so that gas flow may be maintained therearound. At the center of chamber 160 is provided a honeycombed hemispherical element 180. The honeycomb in one embodiment involves horizontally running hexagonally cross sectioned channels 182 postioned as shown. The material utilized for the honeycomb may be either metal or ceramic material. It will be appreciated that due to the hemispherical shape, light coming in at an oblique angle will nonetheless enter the open honeycomb channels "end on".

As illustrated by arrows 184 incoming gas is transmitted via the outer portion of the co-axial line and impinges on the interior surface of the outer window from which point it is directed through orifices 170 and 172 to impinge on inner window 168 and directly on honeycomb structure 180. The gas travels through the honeycomb structure and exits as shown by arrows 186. The window structure establishes a primary flow path through central orifices 172 and 176 such that a large portion of the gas is directly passed to the honeycomb element. A secondary gas flow which is turbulent in nature is created by orifices 170 such that gas circulates around the interior windows 166 and 168 thereby to cool the windows and to extract energy. It will be appreciated that the turbulent gas also circulates around ends 178 of inner window 168 thereby to provide cooling of this window from both surfaces.

Figure 13:
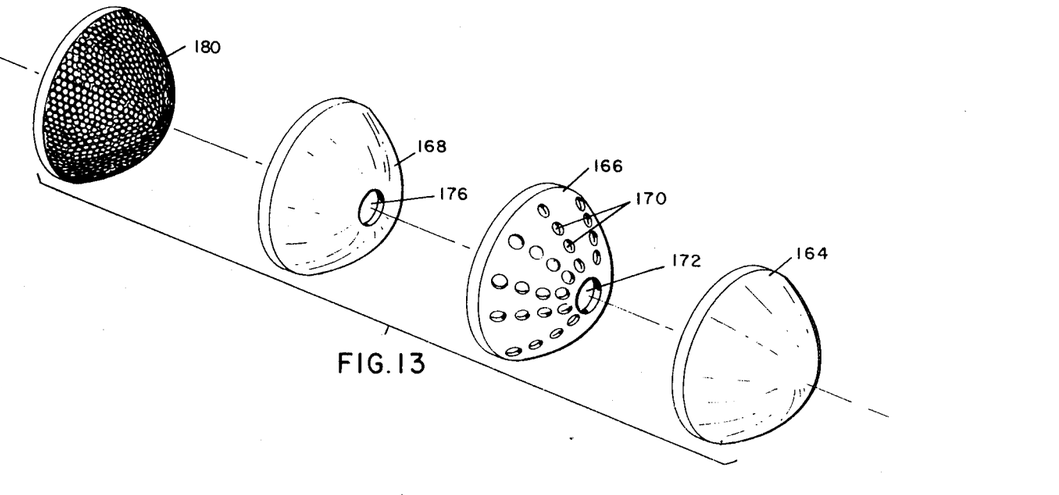
FIG. 13 is an exploded diagram of the windows utilized in combination with the honeycomb structure of the heat exchanger of FIG. 12.

Further, to complete the description of this embodiment, the honeycomb structure is supported within the chamber 160 via supports 188. The positioning of the windows and their configuration is additionally illustrated in the exploded diagram of FIG. 13 in which like elements are referred to with like reference characters.

It can be seen that solar energy is coupled into the gas via convective transfer from the windows and via convective transfer from the honeycomb structure. For most of the incoming radiation, internal reflection within the honeycomb provides that the energy flow is from right to left, again the same direction as the gas flow. Thus as the gas flows from right to left, the energy is reflected in the same direction as the gas flow and very little, if any, energy is reflected left to right. Thus a maximum of energy is transferred to the gas and the heat exchanger - sealed cavity combination approximates a black body receiver in which all of the incident energy of interest is transferred to the gas.

Tower-Mount Design

Figure 14:
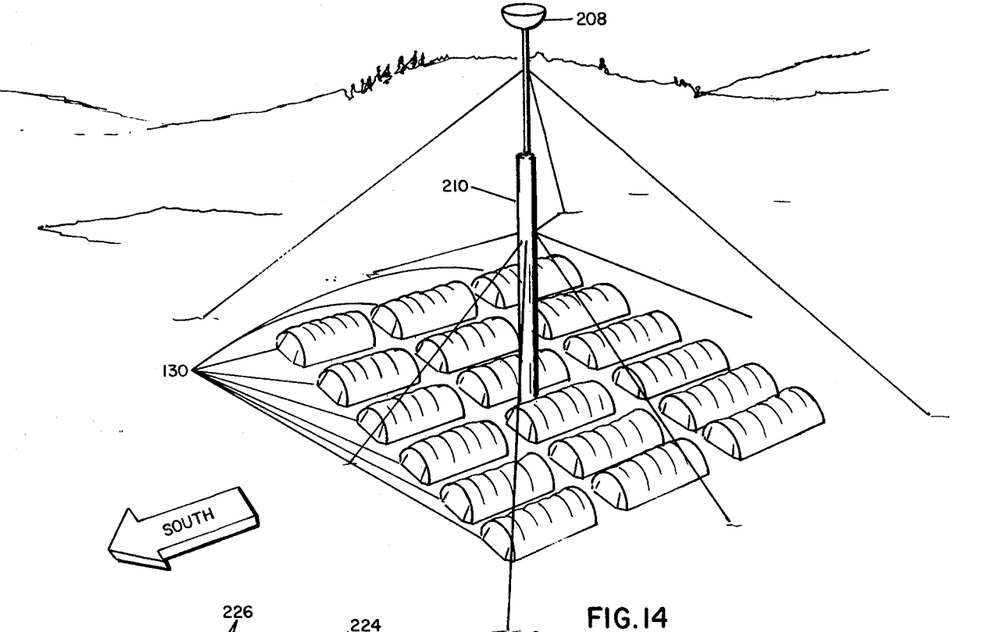
FIG. 14 is a diagrammatic representation of an energy conversion system in which the heat exchanger is located on a mast above individually steerable planar reflectors.
Figures 15, 16:
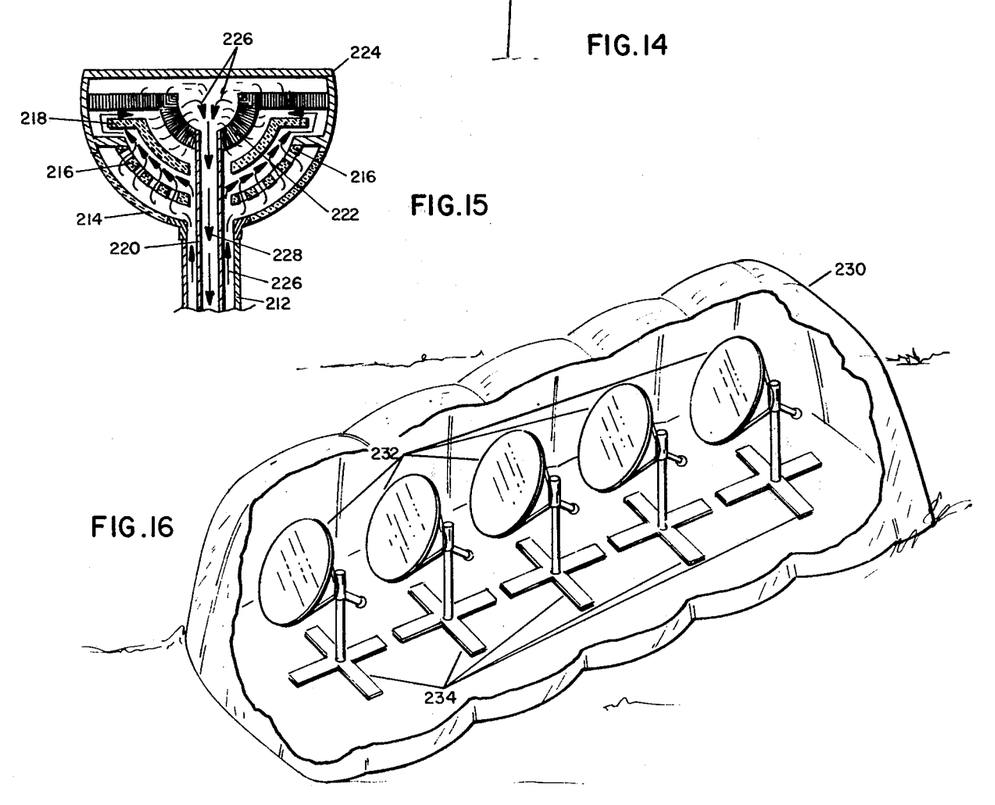
FIG. 15 is a sectional representation of the black body receiver used in the system of FIG. 14.
FIG. 16 is a diagrammatic representation of a series of individually steerable planar reflectors housed in transparent inflated housings to minimize wind loading.

As mentioned hereinbefore, and as illustrated in FIG. 14, a black body receiver 208 may be mounted on top of a mast 210 and configured such that the face of the black body receiver is directed downwardly as illustrated in FIG. 15. The black body receiver may be of the multi-window type described in which the initial gas stream is injected co-axially from co-axial line portion 212 which enters the receiver centrally through its outer window 214. The receiver is also provided with an intermediate apertured window 216 and an inner window 218. Windows 214, 216 and 218 have a central aperture through which extends an inner portion 220 of the co-axial line, the return line for the receiver. The honeycomb is configured hemispherically as illustrated at 222 such that the honeycomb channels extend radially from the center of the receiver. The topmost portion of the receiver includes a flat wall portion 224 which redirects incoming gas illustrated by arrows 226 out through the central portion 220 of the co-axial line. The exit gas illustrated by arrows 228 is heated due to the reflection of solar energy to the black body receiver 208 via a number of steerable mirrors located in inflatable housings 230 at the base of the mast. These steerable mirrors are illustrated in FIG. 16 by reference character 232 to be mounted on pedestals 234. On top of the pedestals is a gimbal arrangement (not shown) which is driven such that the reflectors track the sun and such that all radiation from the sun is reflected via these reflectors towards the black body receiver at the top of the mast. In this manner large quantities of solar energy are directed towards the black body receiver which in this case is designed for a 1 megawatt output.

What has therefore been provided is a solar energy conversion system in which solar energy is coupled into a gas via the focusing of the solar energy onto a black body receiver. The black body receiver is one which reduces retroreflection to a minimum and one which lets no captured heat escape via the use of impingement cooled windows which act as traps or diodes at wavelengths between 0.3 and 3 microns. The receiver is constructed so that it can withstand the high temperatures associated with focused solar radiation. The use of a gas rather than a liquid minimizes corrosion problems normally associated with high temperature heat exchangers while taking advantage of the increased efficiency that occurs with an increase in working temperature. In all of the embodiments it will be appreciated that the black body receiver is at the focus of the optical system.

Although a specific embodiment to the invention has been described in considerable detail for illustrative purposes, many modifications will occur to those skilled in the art. For instance, the heat exchanger may include a series of mesh screens, either staggered or of expanded metal and may include any apertured material which permits gas flow therethrough, it being understood that greater efficiency is obtained when the heat exchanger is of a honeycomb configuration with tubes facing the incoming radiation. Moreover, the heat exchanger material may be any material which will withstand the heat, whether specular or not. Non-specular materials are preferred where the heat exchanger presents a substantial area perpendicular to the optical axis of the system. For lower cost, the impingement cooled windows may be omitted, howbeit with an efficiency drop which is especially severe at high operating temperatures. It is therefore desired that the protection afforded by Letters Patent be limited only by the true scope of the appended claims.

I claim:

1. A solar energy conversion system utilizing means for focusing solar radiation comprising:
   a hollow bodied housing having an opening at one end;
   a window disposed in said opening, said window being spaced from said focusing means and heated by the concentrated radiation from the focusing means;
   a number of tubes in said housing;
   means orienting said tubes such that focused solar radiation impinges on the open ends of said tubes and is internally reflected down said tubes until the majority of said radiation is absorbed at the walls of said tubes to heat them;
   means for providing a flowing heat transfer medium under pressure in said housing; and,
   means for directing said flowing heat transfer medium over said window to cool said window by the transfer of heat from said window to said medium, thereby to prevent failure of said window due to the heating of the window by said concentrated radiation, and for directing said heat transfer medum into said tubes at the ends of said tubes at which said solar radiation impinges, such that the same heat transfer medium cools said window and removes heat from said tubes.

2. A solar energy conversion system utilizing means for focusing solar radiation comprising in combination:
   a hollow bodied housing having an opening at one end and adapted to receive focused solar radiation through said one end;
   means for providing a stream of gas under pressure in said housing;
   a window disposed in said opening, said window being spaced from said focusing means and heated by the concentrated radiation from said focusing means;
   a heat exchanger in said housing including a body having a number of channels running therethrough;
   means for positioning said body such that focused solar radiation impinges on the open ends of said channels; and,
   means for directing said gas stream to impinge on and flow over said window and to flow into said channels at one end of said heat exchanger such that the same gas prevents window melting and removes heat from said heat exchanger, thereby to prevent failure of said window due to the heating of the window by the focused solar radiation.

3. The solar energy conversion system of claim 2 wherein said opening is at least as large as the portion of the channeled body facing said focused solar radiation.

4. A solar energy conversion system utilizing means for focusing solar radiation comprising in combination:
   a solar energy receiver for transferring energy from focused radiation to said gas stream, said solar energy receiver including a body having a cavity opened at one end, means for mounting said body such that said open end is exposed to said focused radiation, means for providing a stream of gas under pressure in said cavity, means spaced from said focusing means, heated by said focused solar radiation and disposed in said open end for sealing said open end, said means being transparent to a selected broad band of wavelengths of said focused radiation and being reflective at wavelengths longer than those within said broad band, heat exchanger means positioned within said cavity to be exposed to radiation passing through said sealing means, said heat exchanger having means for permitting gas flow therethrough and means for directing said gas stream into said cavity between said heat exchanger means and said sealing means to create a cooling gas flow over said sealing means and for removing said gas from said cavity downwstream of said heat exchanger means such that the same gas cools said sealing means and removes heat from said heat exchanger means, whereby failure of said window due to the heating of the window by the focused radiation is prevented.

5. The solar energy conversion system of claim 4 wherein said heat exchanger means includes a body having at least one channel with walls oriented such that focused solar radiation impinges on an open end whereby radiation reflected back to said sealing means is minimized while energy transfer to said gas stream is maximized.

6. The solar energy conversion system of claim 4 wherein said heat exchanger means includes a honeycomb structure.

7. The solar energy conversion system of claim 4 and further including at least one additional window interposed between said sealing means and said heat exchanger means and configured such that gas impinging on said sealing means is permitted to flow by said at least one additional window to said heat exchanging means, thereby to cool said additional window.

8. The solar energy conversion system of claim 7 wherein said at least one additional window is apertured.

9. The solar energy conversion system of claim 7 wherein said at least one additional window includes mounting means surrounding said window having means for spacing said at least one additional window from the cavity walls to permit gas flow around the edges of said at least one additional window.

10. A solar energy receiver for use with means for focusing solar radiation comprising:
   a body having a cavity opened at one end;
   a window spaced from said focusing means and heated by said focused solar radiation, said window being disposed in said open end and adapted to be cooled by a flowing heat transfer medium;
   heat exchanger means;
   means for positioning said heat exchanger means within said cavity such that said heat exchanger means is exposed to radiation passing through said open end, said heat exchanger having means for permitting heat transfer medium flow therethrough; and,
   means for introducing said flowing heat transfer medium into said cavity between said heat exchanger means and said open end to form a cooling flow over said window such that the same heat transfer medium cools said window and removes heat from said heat exchanger means, whereby failure of said window due to the heating of the window by the focused radiation is prevented.

11. The receiver of claim 10 wherein said heat exchanger means includes a body having at least one channel oriented such that focused radiation impinges on an open end of said channel.

12. The receiver of claim 10 wherein said heat exchanger means includes a honeycomb structure.

13. The receiver of claim 10 wherein said window includes a means for sealing said open end, said window being transparent to a selected broad band of wavelengths of said focused radiation and being reflective at wavelengths longer than those within said board band.

14. The receiver of claim 13 and further including at least one additional window interposed between said first mentioned window and said heat exchanger means and configured such that said heat transfer medium impinging on said first mentioned window is permitted to flow by said at least one additional window to said heat exchanging means.

15. The receiver of claim 14 wherein said at least one additional window includes mounting means surrounding said window having means for spacing said at least one additional window from the cavity walls to permit said medium to flow around the edges of said at least one additional window.

16. A solar energy conversion system comprising in combination:
   means for focusing solar radiation to a predetermined location spaced from said focusing means;
   a solar receiver at said predetermined location including a hollow bodied housing having an opening at one end adapted to face said focusing means; means for providing a flowing heat transfer medium under pressure within said housing; a window disposed in said opening and heated by the radiation from said focusing means; a heat exchanger including a number of tubes in said housing; means for orienting said tubes such that focused solar radiation impinges on the open ends of said tubes and is internally reflected down said tubes until the majority of said radiation is absorbed on the walls of said tubes to heat them; and means for directing said flowing heat transfer medium over said window to cool said window by the transfer of heat from said window to said medium, and for directing said heat transfer medium into said tubes at the ends of said tubes at which said solar radiation impinges, such that the same heat transfer medium cools said window and removes heat from said tubes, thereby to prevent failure of said window due to the heating of the window by the focused radiation.

17. A solar energy conversion system comprising in combination:
   means for focusing solar radiation to a predetermined location;
   a hollow bodied housing having an opening at one end adapted to face said focusing means;
   means for providing a stream of gas under pressure within said housing;
   a window spaced from said focusing means and heated by the radiation from said focusing means, said window being disposed in said opening;
   a heat exchanger in said housing including a body having a number of channels running therethrough;
   means for positioning said body such that said focused solar radiation impinges on the open ends of said channels; and,
   means for introducing said gas stream to impinge on and flow over said window and to flow into said channels at one end of said heat exchanger such that the same gas cools said window and removes heat from said heat exchanger, thereby to prevent failure of said window due to the heating of the window by the focused radiation.

18. The solar energy conversion system of claim 17 wherein said opening is at least as large as the portion of the channeled body facing said focusing means.

19. A solar energy conversion system comprising in combination:
   means for focusing solar radiation to a predetermined location;
   a solar energy receiver at said location for transferring energy from said focused radiation to said gas stream, said solar energy receiver including a body having a cavity opened at one end, means for providing a stream of gas under pressure in said cavity; means for mounting said body such that said open end is exposed to said focused radiation, means spaced from said focusing means, heated by the radiation from said focusing means and disposed in said open end for sealing said open end, said means being transparent to a selected broad band of wavelengths of said focused radiation and being reflective at wavelengths longer than those within said broad band, heat exchanger means positioned within said cavity to be exposed to radiation passing through said sealing means, said heat exchanger having means for permitting gas flow therethrough, and means for introducing said gas stream into said cavity between said heat exchanger means and said sealing means to create a cooling gas flow over said sealing means and for removing said gas from said cavity downstream of said heat exchanger means, such that the same gas cools said sealing means and removes heat from said heat exchanger means, thereby to prevent failure of said sealing means due to the heating of the sealing means by the focused radiation.

20. The solar energy conversion system of claim 19 wherein said heat exchanger means includes a body having at least one channel with walls oriented such that said focused solar radiation impinges on an open end whereby radiation reflected back to said sealing means is minimized while energy transfer to said gas stream is maximized, and wherein said receiver is stationary.

21. The solar energy conversion system of claim 19 wherein said heat exchanger means includes a honeycomb structure.

22. The solar energy conversion system of claim 19 and further including at least one additional window interposed between said sealing means and said heat exchanger means and configured such that gas impinging on said sealing means is permitted to flow by said at least one additional window to said heat exchanging means, thereby to cool said additional window.

23. The solar energy conversion system of claim 22 wherein said at least one additional window is apertured.

24. The solar energy conversion system of claim 22 wherein said at least one additional window includes mounting means surrounding said window having means for spacing said at least one additional window from the cavity walls to permit gas flow around the edges of said at least one additional window.

25. A solar energy conversion system utilizing means for focusing solar radiation comprising in combination:
   means for providing a stream of gas under pressure; and,
   a solar energy receiver for transferring energy from focused solar radiation to said gas stream, said solar energy receiver including a body having a cavity opened at one end, means for mounting said body such that said open end is exposed to said focused radiation, means spaced from said focusing means, heated by said focused solar radiation and located at said open end for sealing said open end, said means being transparent to a selected broad band of wavelengths of said focused radiation and being reflective at wavelengths longer than those within said broad band, heat exchanger means positioned within said cavity to be exposed to radiation passing through said sealing means, said heat exchanger having means for permitting gas flow therethrough, means for introducing said gas stream into said cavity between said heat exchanger means and said sealing means to create a cooling gas flow at said sealing means and for removing said gas from said cavity downstream of said heat exchanger means; and at least one additional window interposed between said sealing means and said heat exchanger means and configured such that gas impinging on said sealing means is permitted to flow by said at least one additional window to said heat exchanging means, thereby to cool said additional window.

26. A solar energy receiver for use with means for focusing solar radiation comprising:
   a body having a cavity opened at one end;
   a window spaced from said focusing means and heated by said focused solar radiation, said window being positioned adjacent said opened end and adapted to be cooled by a flowing heat transfer medium;
   heat exchanger means positioned within said cavity to be exposed to radiation passing through said opened end, said heat exchanger having means for permitting heat transfer medium to flow therethrough;
   means for introducing said flowing heat transfer medium into said cavity between said heat exchanger means and said open end to form a cooling flow at said window, said window including a means for sealing said open end, said window being transparent to a selected broad band of wavelengths of said focused radiation and being reflective at wavelengths longer than those within said broad band; and,
   at least one additional window interposed between said first mentioned window and said heat exchanger means and configured such that said heat transfer medium impinging on said first mentioned window is permitted to flow by said at least one additional window to said heat exchanging means.

27. A solar energy conversion system comprising in combination:
   means for focusing solar radiation to a predetermined location;
   means for providing a stream of gas under pressure; and,
   a solar energy receiver at said location for transferring energy from said focused radiation to said gas stream, said solar energy receiver including a body having a cavity opened at one end, means for mounting said body such that said open end is exposed to said focused radiation, means spaced from said focusing means, heated by the radiation from said focusing means and at said open end for sealing said open end, said means being transparent to a selected broad band of wavelengths of said focused radiation and being reflective a wavelength longer than those within said broad band, heat exchanger means positioned within said cavity to be exposed to radiation passing through said sealing means, said heat exchanger having means for permitting gas flow therethrough, means for introducing said gas stream into said cavity between said heat exchanger means and said sealing means to create a cooling gas flow at said sealing means and for removing said gas from said cavity downstream of said heat exchanger means, and at least one additional window interposed between said sealing means and said heat exchanger means and configured such that gas impinging on said sealing means is permitted to flow by said at least one additional window to said heat exchanging means, thereby to cool said additional window.

28. A solar energy receiver adapted for use with focused solar radiation from a solar collector, comprising:
   a hollow housing spaced from said solar collector, said housing having an aperture;
   a heat exchanger in said housing, spaced from said aperture and having means for conducting a flowing heat transfer medium thereabout from one end thereof to another;
   means for mounting said housing such that focused solar radiation passes through said aperture and impinges on said heat exchanger;
   a window disposed in said aperture, said window being heated by said focused radiation; and,
   means for providing a flowing heat transfer medium within said housing such that said medium flows over said window and about said heat exchanger, such that the same medium cools said window to prevent failure and extracts energy from said heat exchanger.

29. A solar energy receiver adapted for use with focused solar radiation from a solar collector, comprising:
 a hollow housing spaced from said solar collector, said housing having an aperture;
 a heat exchanger in said housing and spaced from said aperture for heating up a heat transfer medium;
 means for mounting said housing such that focused solar radiation passes through said aperture and impinges on said heat exchanger;
 a window disposed in said aperture and heated by said focused radiation; and,
 means for flowing a portion of said heat transfer medium over said window to cool said window to prevent failure and to present said portion to said heat exchanger after it flows over said window.

* * * * *